United States Patent [19]

Chandler et al.

[11] 4,354,058
[45] Oct. 12, 1982

[54] PORTABLE FIELD CONTROL UNIT FOR EMERGENCY TELEPHONE COMMUNICATIONS

[75] Inventors: Donald A. Chandler, Reno; John W. Harper, Sparks, both of Nev.

[73] Assignee: S.I.C., Inc., Havertown, Pa.

[21] Appl. No.: 162,415

[22] Filed: Jun. 24, 1980

[51] Int. Cl.³ .............................................. H04M 3/22
[52] U.S. Cl. ................................. 179/1 MN; 179/91 R
[58] Field of Search ................... 179/1 R, 1 MN, 5 R, 179/91 R, 103, 175, 175.1 R, 175.2 C, 175.3 S, 18 FH, 27 FE, 51 DA, 62, 63, 1.5 R, 1.5 M; 340/310 R, 310 A

[56] References Cited

U.S. PATENT DOCUMENTS 2,468,749 5/1949 Groh .................................. 179/91 R
3,704,347 11/1972 Brown ............................... 179/91 R Primary Examiner—Joseph A. Popek
Attorney, Agent, or Firm—Weissenberger & Peterson

[57] ABSTRACT

A portable field unit for conducting and controlling emergency telephone communications, particularly in hostage situations, is disclosed. Three telephone lines and a monitoring line can be connected to the unit, which can function as a miniature manually operated central office. A prime operator can control a first line and a common line, while a backup operator can control a second line and the common line. The backup operator can monitor the prime operator's line, and the prime operator's line can also be remotely monitored. The first line and the common line can be patched together by the prime operator for direct communication between them. A privacy switch is provided under the prime operator's control to produce a masking tone in the monitoring circuits when a private communication between the first line and the common line is desired.

6 Claims, 3 Drawing Figures

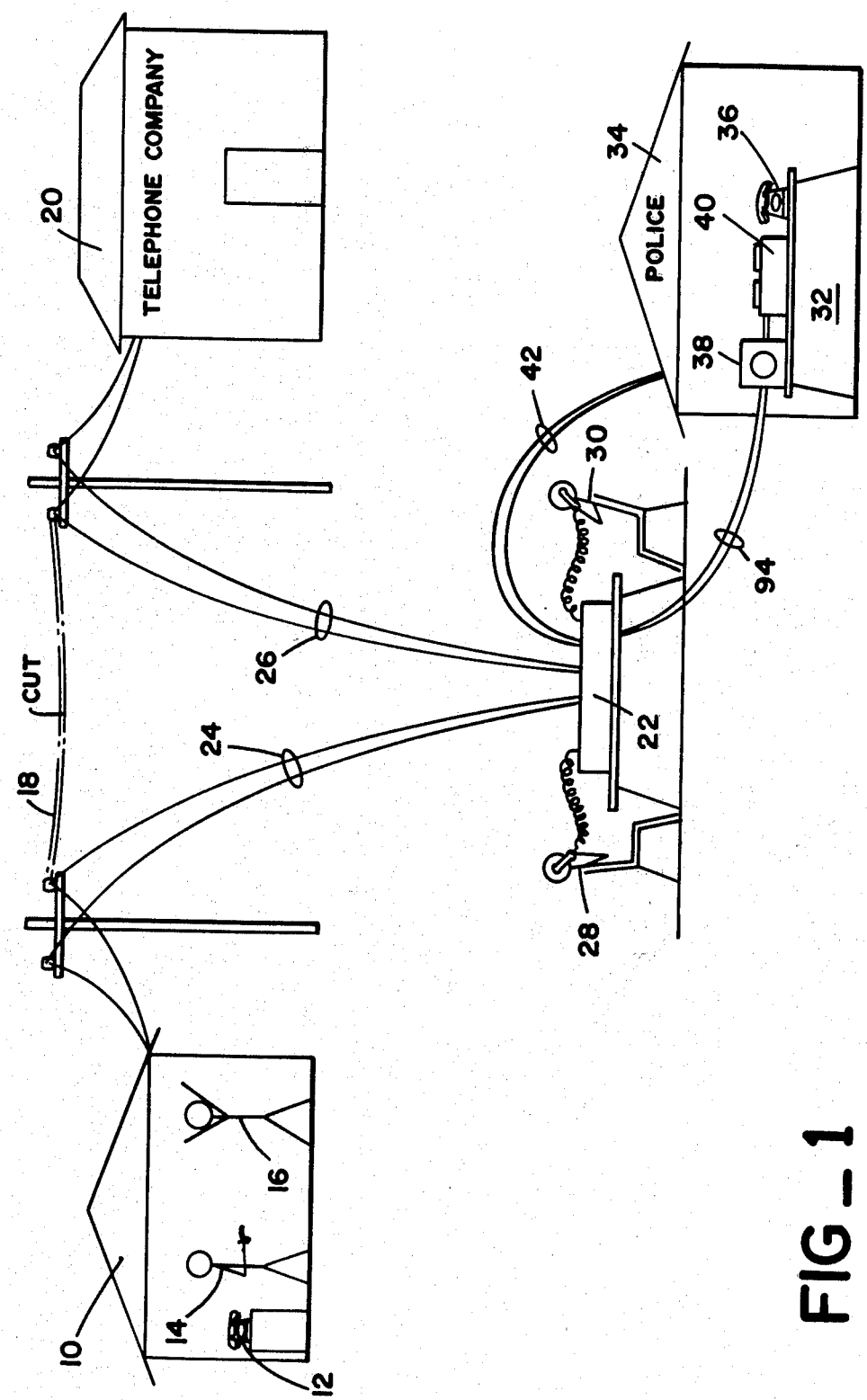
FIG_1

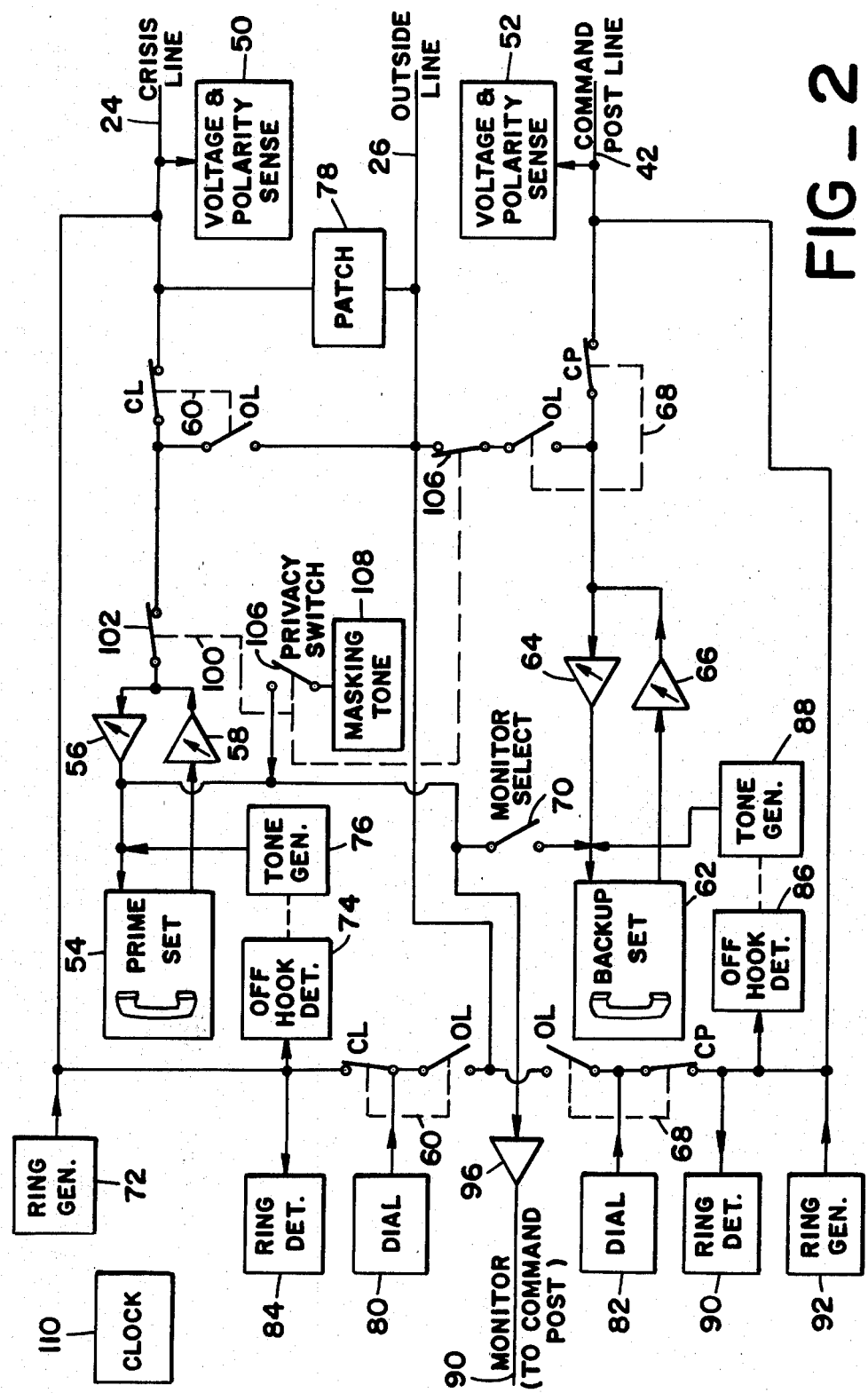

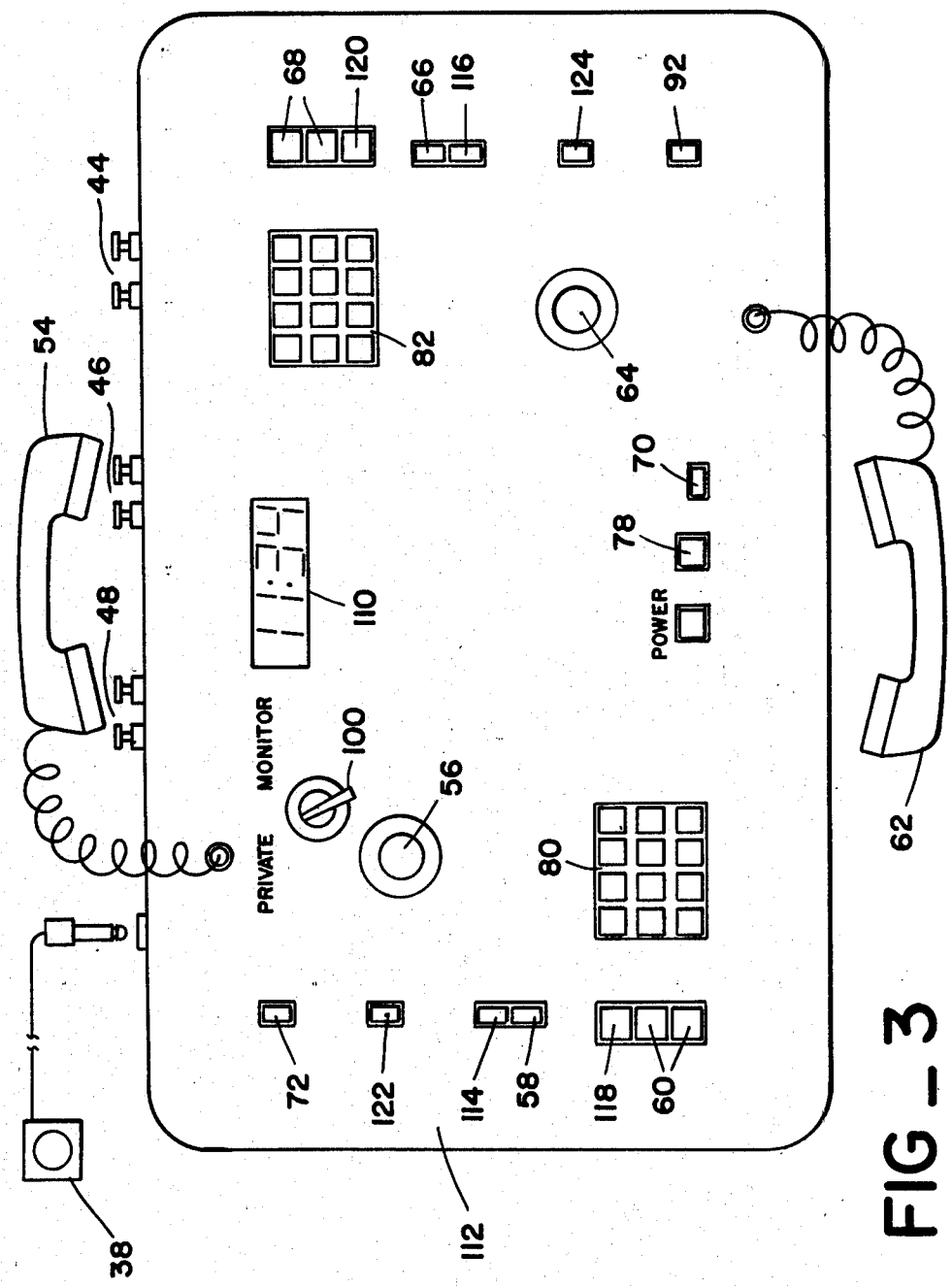
FIG_3

PORTABLE FIELD CONTROL UNIT FOR EMERGENCY TELEPHONE COMMUNICATIONS

BACKGROUND OF THE INVENTION

This invention relates to emergency telephone systems, and particularly to a portable emergency system useful in situations where control over a telephone line has to be exercised, yet in which it must be possible to accord privacy to the user of the line.

Law enforcement agencies are frequently confronted with a situation in which a lawbreaker has barricaded himself in a particular location, and it is impractical for the police to enter that location for an arrest either because the lawbreaker is holding hostages or because he has control over explosives or is otherwise armed in such a way as to make direct capture unadvisable. In such a situation, it is often necessary for a negotiator to be able to communicate with the lawbreaker from a nearby location. Inasmuch as most houses are equipped with a telephone, such a means of communication is usually readily available to the lawbreaker. The problem is that, for an effective handling of the situation, it is necessary for the negotiator to not only exercise control over outside communications to and from the lawbreaker, but also to enable the lawbreaker to hold private conversations upon request, as for example with his attorney.

Present methods of lawbreaker-negotiator communications normally rely on wire taps and are consequently unsatisfactory in both respects.

SUMMARY OF THE INVENTION

The invention solves the above-stated problem by providing a lightweight, self-contained, and self-powered telephone field control unit including switching equipment which can be cut directly into an existing telephone line and which, when so used, allows a negotiating team to control both incoming and outgoing calls on the lawbreaker's line while communicating at will with third parties and with a command post which may be located at some remote location. In addition, the device allows the negotiating team to permit a private conversation between the lawbreaker and a third party on the telephone network, and to make a permanent record of the fact that the conversation was indeed private.

BRIEF DESCRIPTION OF THE DRAWINGS

FIG. 1 is a schematic diagram of a typical environment in which the device of this invention may be used; and FIG. 2 is a block diagram of the device of this invention.

FIG. 3 is a plan view of the control board of a preferred embodiment of the device.

DETAILED DESCRIPTION OF THE INVENTION

FIG. 1 illustrates a typical situation in which the device of this invention may be used. In a house 10 equipped with an ordinary telephone subscriber set 12, an extortionist 14 is holding a hostage 16. A telephone line 18 normally extends from the house 10 to the telephone company central office 20. In order to take control of the communications available to the extortionist 14, the telephone line 18 is cut between the house 10 and the central office 20, and the cut ends are connected to the field unit 22 of this invention to form the crisis line 24 and outside line 26 of FIG. 2. The field unit 22 can be set up at any appropriate location and provides communications for a negotiating team consisting of a prime operator 28 and a backup operator 30. In the depicted situation, the prime operator 28 would be the negotiator, while the backup operator 30 would handle communications between the field unit 22 and a command post 32, which may be located at the police station 34 or at any other convenient location. The command post 32 preferably includes a telephone 36, and (at the same location or at a different one) a monitor speaker 38 coupled with a tape recorder 40. The command post telephone 36 is connected to the field unit 22 by a command post line 42 which may be connected to the command post 32 directly or through the central office 20, depending on the circumstances.

FIG. 2 shows, in block diagram form, the operation of field unit 22. The crisis line 24 and command post line 42 are connected to appropriate terminals 44 and 46, respectively (FIG. 3), and the outside line 26 is connected to a terminal 48. The terminals 44 and 46 are electrically monitored by voltage and polarity sensing circuits 50, 52, respectively, which determine that the voltage and polarity on the crisis line and command post line match those of the outside line. The circuits 50, 52 are of conventional design and are arranged to operate indicator lights (not shown) on the negotiating unit 22 to indicate whether the crisis line and command post line have been correctly connected.

The prime operator's handset (or headset) 54 can be connected through volume control amplifiers 56, 58 and prime selector switch 60 to either the crisis line 24 or the outside line 26. The backup operator's handset (or headset) 62, on the other hand, can be connected through its volume control amplifiers 64, 66 and backup selector switch 68 to either the command post line 42 or the outside line 26.

It will thus be seen that in the preferred embodiment of the invention, the prime operator 28 (who would be the negotiator in the situation of FIG. 1) can handle the extortionist's communications while the backup operator 30 handles the communications between the negotiating team and the command post. Alternatively, if the backup operator is himself the commander, the command post line 42 may be connected to the headset of a SWAT team leader outside the house 10. In this manner, the extortionist 14 cannot accidentally overhear police communications. On the other hand, the backup operator 30 can, by closing the crisis line monitor switch 70, hear what is being said on the crisis line 24.

The prime operator 28 can cause the telephone 12 to ring by actuating the conventional ring generator 72 connected to crisis line 24. In the opposite direction, the conventional off-hook detector 74 detects an off-hook condition on the crisis line 24 and actuates a tone generator 76 which injects an audible tone into the prime operator's telephone set 54 until the tone generator 76 is disabled by the prime operator's connecting himself to the crisis line 24.

If the extortionist 14 demands to talk to a third party, the prime operator 28 can patch the crisis line 24 directly into the outside line 26 through a conventional patch circuit 78. If this is done, the prime operator 28 can monitor both sides of the conversation as long as the prime select switch 60 is in the CL (crisis line) position. Normally, a negotiator would want to make sure that, when the lawbreaker makes a call to the outside world, he is really calling the person he says he wishes to call. This can be done by having the prime operator or the backup operator establish the connection on the outside line 26 through either the prime dial pad 80 or the backup dial pad 82, and activating the path circuit 78 only after the connection has been established. If the crisis line goes through a central office before reaching the field unit 22, intervention of telephone company personnel at the central office is required to prevent the extortionist from dialing out at will through the central office equipment.

If the crisis line is connected through a central office, the conventional prime ring detector 84 will signal an incoming call from the extortionist's telephone 12 by actuating an appropriate audible or visual indicator (not shown). At the backup position, the command post line 42 may be either connected directly to the command post, or it may be connected to the command post through the commercial telephone network. In the former case, the off-hook detector 86 and tone generator 88 function in the same manner as off-hook detector 74 and tone generator 76 to alert the backup operator 30 that the command post line telephone 36 is off hook. If the command post line 42 goes through the commercial telephone network, the backup ring detector 90 provides an appropriate signal when a call comes in on the command post line 42. In the case of a direct connection of the command post line 42 to the command post telephone 36, the backup ring generator 92 may be used to ring the command post telephone 36. A monitoring line 94 may be connected to the loudspeaker 38 at the command post 32 or other appropriate location through amplifier 96. The loudspeaker 38, together with the tape recorder 40 preferably connected to it, provides an opportunity for police personnel to continuously monitor everything said and heard by the prime operator 28.

If the extortionist 14 wishes to conduct a privileged communication with a third party advisor (for example, his attorney), the prime operator 28 may actuate the privacy switch 100. This opens contacts 102 and 104 so as to disconnect both operators from the crisis line 24 and the outside line 26. Simultaneously, contact 106 is closed to inject into the monitoring circuits a 1.5 kHz masking tone produced by masking tone oscillator 108.

As shown in FIG. 3, the privacy switch 100 is preferably a rotary switch whose position is readily visually apparent. It is preferably located adjacent to the clock 110 so that, if necessary, a photographic record can be kept of the time during which the privacy switch 100 was in a privacy mode. The operation of the privacy switch 100 will be reflected by the appearance of the masking tone on the recording made by tape recorder 40. At the same time, the masking tone appearing in the monitoring circuits and in the prime operator's telephone set 54 prevents any crisis-line or outside-line cross-talk from being overheard by the negotiating team or by police personnel.

Referring now to FIG. 3, the controls for the elements shown in FIG. 2 are identified on the control board 112 by the same numerals. In addition, the board 112 preferably contains mike switches 114 and 116 which allow the prime operator 28 and backup operator 30, respectively, to switch off the microphone section of their respective telephone sets while keeping the listening section active, so that they may converse without being overheard. Conventional hold controls 118, 120 may be provided for the prime operator 28 and backup operator 30, respectively, to place on hold any line which the respective operator is using. "Phone on" switches 122, 124 may also be provided to disconnect the prime operator's or backup operator's telephone set, respectively, entirely from the circuitry of the field unit 22 when in the "off" position. Such a disconnection produces an on-hook condition in the conventional manner when the telephone set involved is connected to an outside line.

It will be noted that the features of the field unit 22 lend themselves to the handling of many other emergency situations than the one described herein. Inasmuch as the crisis line 24, outside line 26, and command post line 42 can all be used either for direct connection to a telephone or for connection to the commercial telephone network, most any situation can be handled which requires portable emergency telephone communications. The field unit 22 is preferably equipped with an internal battery power supply (not shown) for short-term use, and also with conventional adapters (not shown) so that it can receive its long-term power from an automotive electrical system or from commercial power lines, whichever may be available in a given situation.

We claim:

1. An emergency communications unit, comprising:
   (a) terminal means for connecting said unit to telephone lines connected either to a telephone network or directly to a telephone;
   (b) monitor output means for connecting monitoring equipment to said unit;
   (c) first and second operator set means;
   (d) means for selectively connecting said first operator set means for bidirectional communication over a first plurality of said telephone lines including connections to said network and to said telephone, and said second operator set means for bidirectional communication over a second plurality of said telephone lines, at least one of said telephone lines being common to both of said pluralities; and
   (e) means for connecting said monitor output means so as to enable monitoring of said first operator set means.

2. An emergency communications control unit, comprising:
   (a) terminal means for connecting to said unit a plurality of telephone lines;
   (b) operator set means selectively connectable to a pair of said telephone lines;
   (c) patch means for patching said pair of telephone lines together independently of said operator set means; and
   (d) privacy means including:
      (i) privacy switch means which, when actuated, disconnect said operator set means from both of said pair of telephone lines when they are patched together; and
      (ii) masking tone generator means for producing an audible tone;
      (iii) said privacy switch means being operatively connected to said masking tone generator so as to apply, when actuated, said audible masking tone to said operator set means.

3. The unit of claim 2, in which monitoring means are provided to normally monitor conversations on at least one of said pair of lines; and in which said masking tone is injected into said monitoring means, when said privacy switch is actuated, at a level sufficient to mask any conversations reaching said monitoring means.

4. The unit of claim 2, in which said unit further comprises time display means, and in which said privacy switch means provide a clear visual indication of their position, said time display means and privacy switch means being so positioned as to permit their simultaneous visual observation, whereby the time during which said privacy switch means are actuated can readily be photographically recorded.

5. A system for selectively controlling communications on a telephone line between a telephone subscriber set and a central office comprising:
(a) portable control unit means interposed in said line between said subscriber set and said central office;
(b) said control unit means having patching means selectively connecting said subscriber set to said central office under the control of an operator at said control unit means;
(c) said control unit means further having operator set means selectively allowing communication between said operator set and said subscriber set or said central office, or both simultaneously; and
(d) privacy means associated with said control unit means, said privacy means being under the control of said operator for selectively conveying a masking tone to said operator set means while disconnecting said operator set means from both said subscriber set and said central office.

6. The system of claim 5, further comprising monitoring means for monitoring the communications of said operator set means, said masking tone being also conveyed to said monitoring means when said privacy means are actuated.

* * * * *

UNITED STATES PATENT AND TRADEMARK OFFICE
CERTIFICATE OF CORRECTION

PATENT NO. : 4,354,058
DATED : October 12, 1982
INVENTOR(S) : Donald A. Chandler & John W. Harper It is certified that error appears in the above—identified patent and that said Letters Patent is hereby corrected as shown below:

Column 3, line 6 - "path" should read --patch--.

Signed and Sealed this

Fourth Day of January 1983

[SEAL]

Attest:

GERALD J. MOSSINGHOFF

Attesting Officer

Commissioner of Patents and Trademarks